March 3, 1936. R. A. CROCKETT 2,032,837
BRAKE MECHANISM
Filed June 6, 1932 2 Sheets-Sheet 2

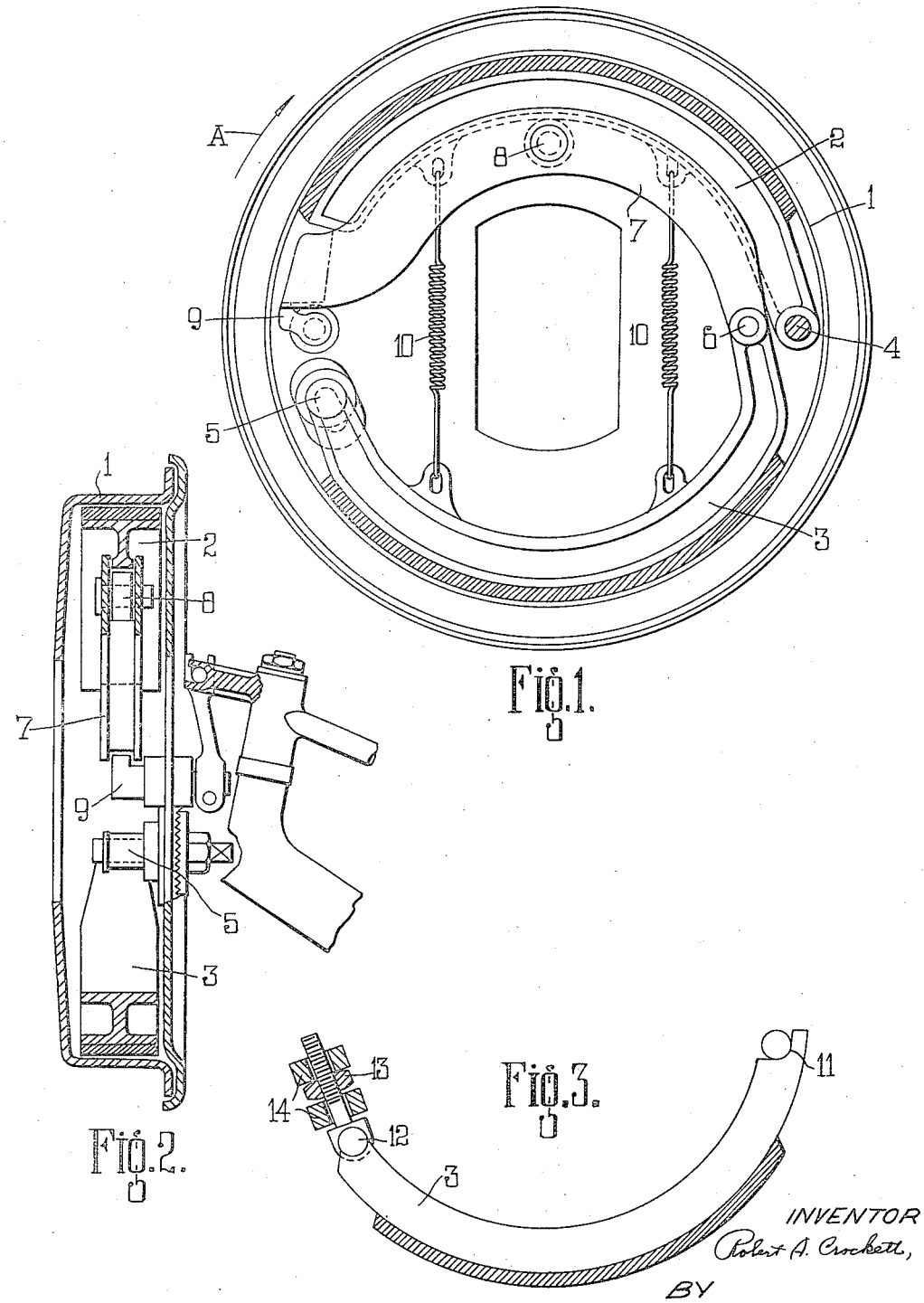

INVENTOR
Robert A. Crockett,
BY
ATTORNEYS

Patented Mar. 3, 1936

2,032,837

UNITED STATES PATENT OFFICE 2,032,837

BRAKE MECHANISM

Robert Alfred Crockett, Liverpool, England

Application June 6, 1932, Serial No. 615,724
In Great Britain June 11, 1931

9 Claims. (Cl. 188—78)

The present invention relates to brake mechanism.

It is known, in connection with standard brakes, that for a given cam pressure, the braking effort is roughly proportional to the co-efficient of friction of the brake linings employed. It is also known, in connection with servo or self energizing brakes, i. e. in brakes in which the frictional drag of one shoe is used to assist in pressing a neighbouring shoe against the brake drum, that the braking effort increases very rapidly with increase of co-efficient of friction of the linings and the possibility exists with self energizing brakes, that access of rust or grit to the linings may cause an increase in the co-efficient of friction and a dangerous increase in the braking effort.

Thus, brakes in which the frictional drag of one shoe is not transmitted to the next shoe are safer to use, but they possess the disadvantage that a high static load or cam pressure must be applied to each shoe in order to obtain a high braking effort. For example, if it is desired to apply a pressure of 240 lbs. to each of three shoes in a brake drum, it is usually necessary to apply a total force of 720 lbs., with the result that large leverages must be used between the operating lever and the drum with the consequent risk of distortion of the chassis to which the brake is fitted and the necessity for frequent adjustment of the operating lever for wear of the linings.

The object of the present invention is to provide a brake mechanism in which relatively high braking efforts can be obtained by means of a relatively low total cam pressure without necessarily applying the frictional drag of one shoe to a neighbouring shoe.

According to the present invention, braking force is applied to two or more shoes by a lever system comprising levers actually or virtually freely pivoted together at their adjacent ends, the remote end of the lever system being mounted about a fixed pivot, whilst braking pressure is applied to the other remote end of the lever system by cam or like means.

A brake shoe may in certain cases, constitute one of the levers.

The invention is more particularly described with reference to the accompanying drawings, in which:—

Figure 1 is a sectional elevation of brake drum shoes.

Figure 2 is a corresponding side sectional elevation.

Figure 3 is a side elevation of an alternative form of shoe.

Figure 4:
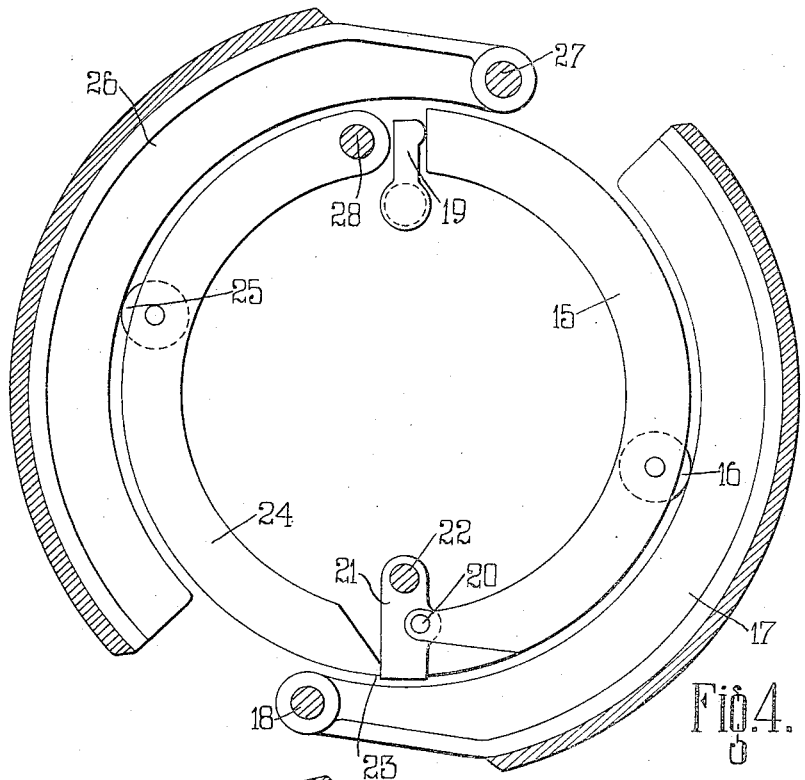
Figure 4 is a side elevation of a modified disposition of brake shoes and operating levers.

A retarding effort is applied to a brake drum 1 by shoes 2, 3. The shoe 2 is pivoted about a fixed pivot 4, whilst the shoe 3 is pivoted about a fixed pivot 5, which may be adjustable to compensate for wear of the linings of the shoes 2, 3. The shoe 3 is connected by a floating pivot 6 to an arcuate lever 7 adapted to engage the shoe 2 by means of a roller abutment 8.

The free end of the lever 7 is engaged by an operating cam 9. The usual hold-off springs 10 may be provided between the shoes.

It will consequently be seen that both shoes 2, 3, in the above described arrangement, are self-energizing.

If desired, one of the shoe, such as the shoe 3, may be formed as shown in Figure 3, in which the connection to the lever 7 is in the form of an open abutment 11, whilst the other end of the shoe is connected by an eye-bolt 12 to a nut 13 having a limited degree of freedom between stops 14. This will therefore, provide a self-energizing shoe in the reverse direction of motion; that is to say, the reverse to that of the arrow A, Figure 1.

In the modified form of construction shown in Figure 4, an arcuate lever 15 has a roller 16 engaging a shoe 17 pivoted about a fixed pivot 18, at a point intermediate its ends. This arcuate lever 15 is operated by means of an operating cam 19, and is pivoted by means of a floating pivot 20 to a free auxiliary lever 21 pivoted about a fixed pivot 22, and having a sliding connection with the end 23 of a second arcuate lever 24 provided with a roller 25 or the like abutment engaging a second shoe 26 intermediate its ends, one end of this shoe 26 being pivoted about a fixed pivot 27, whilst said arcuate lever 24 is pivoted about a fixed pivot 28.

Figure 5:
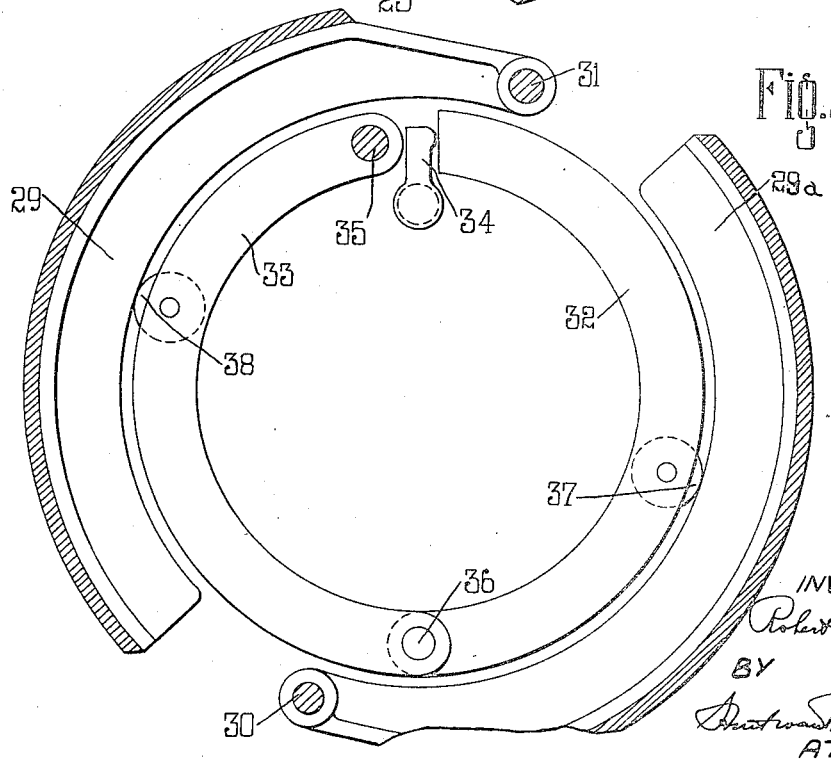
Figure 5 is a similar view of a further modified arrangement.

In the modified form of construction shown in Figure 5, the shoes 29, 29a are pivoted about fixed pivots 30, 31 disposed substantially diagonally of the brake drum, and are operated by a pair of arcuate levers 32, 33 the lever 32 being operated by means of the cam 34, whilst the lever 33 is mounted about a fixed pivot 35. The two levers 32, 33, are connected by means of a floating pivot 36.

The rollers 8, 16, 25; 37, 38 may be mounted in any desired position with respect to the ends of the levers. Assuming the levers to be of approximately 180° arcuate length, and each roller to be mounted at the midlength of the respective lever, then a force P applied by the cam to the free end of one lever would cause an outward force of 2P to be exerted by each roller on the respective shoe contacting therewith, and a reaction of P on the floating pivot.

These values may be decreased or increased respectively by mounting the rollers nearer or further away from the cam, 9, 19, 34 respectively.

Similarly the resulting frictional drag obtained from the shoes with a given lever system can be varied by varying the position of the shoes with respect to the rollers mounted on the levers, i. e. by displacing the pivotal axes of the shoes circumferentially about the brake drum.

It is obvious that a hydraulic plunger may be substituted for the cam 9, 19, 34 respectively.

In these forms of construction, particularly suitable for a brake with a plurality of shoes, arcuate levers corresponding in number to the number of shoes and each having a roller mounted thereon may be arranged in series, the free end of the first lever of the series being adapted for engagement by a cam as illustrated by the numerals 9, 19, or 35 in the accompanying drawings whilst the end of the last lever of the series is mounted on a fixed pivot. The adjacent ends of each pair of levers may be pivotally connected one with the other by floating pivot pins as shown in Figs. 1 and 5, but preferably the end of an earlier lever engages that of the following lever through a short lever as shown by the numeral 21 in Fig. 4 mounted on a fixed pivot as shown by the numeral 22 in Fig. 4 at a point radially inwardly of said arcuate levers, the short lever being connected by a floating pivot as shown by the numeral 20 in Fig. 4 to the earlier arcuate lever of the pair.

The surface of the short lever adapted for engagement with the following arcuate lever and the line connecting the pivotal axis of the short lever with the axis of the pivotal connection between itself and the arcuate lever may be arranged at any suitable inclination to the radius for obtaining a desired pressure on the following arcuate lever corresponding to a given cam pressure.

Preferably, with this arrangement, the shoes are each independently mounted on fixed pivots as shown in Figs. 4 and 5 of the accompanying drawings, and are arranged so that each shoe affords a braking surface over a fractional part of the brake drum.

The arcuate levers 7 described herein are preferably built up of a pair of curved stampings, the rollers 8 being mounted between each pair of stampings whilst bossings 7a or the like may be formed at the ends of the stampings for providing suitable bearings for the pivot pins 6. An end plate or block 7b may be secured between the ends of a pair of stampings for engagement by the cam 9.

In each of the forms described, it will be noted that a lever (7, 15 or 32) is provided which is actuated at one end to cause a rocking thereof toward the brake-engaging position. This lever has an abutment intermediate its length providing a fulcrum by which the lever actuates one of the brake shoes and operates under such conditions as a lever of the second order, in that power is applied at one end, a fulcrum is provided at the other, and power (the braking movement of the shoe) is delivered at an intermediate point of the length. In each example, further, this aforesaid fulcrum at an end of the lever is not a fixed one, but constitutes a floating pivotal support which operates as an abutment engageable with another shoe to effect the braking movement of this other shoe, and under such conditions this lever operates as a lever of the first order, in which power is applied at one end, the fulcrum is intermediate the length, and power is delivered at the opposite end. In the form of Figure 1, the end fulcrum and abutment of the lever (6) acts directly upon this other braking shoe, while in the form of Figures 4 and 5 the action occurs from the pivotal support indirectly through an auxiliary lever 24 or 33 upon the other brake shoe. In each instance, however, the rocking of the lever for producing the braking movement results in transitional movements of the intermediate abutment, and the end abutment, whereby each acts as a fulcrum for the other in delivering power to the brake shoes. Thus, the reaction at one point reappears as action at the other point.

I declare that what I claim is:—

1. A brake comprising in combination a brake drum, an arcuate shoe, a pivot supporting said shoe at its remote end, a second shoe, a pin-and-slot connection supporting said shoe at its remote end, a lever engaging said first shoe intermediate its ends, and abutting against the end of said second shoe, and means to apply braking pressure to the remote end of said lever.

2. A brake comprising in combination a brake drum, an arcuate shoe, a pivot supporting said shoe at one end, a second shoe, a pivot supporting said second shoe at its end remote from the pivot of said first shoe, a lever engaging said first shoe intermediate the ends of the shoe and abutting against the end of said second shoe remote from its pivot and means to apply braking pressure to the end of said lever remote from its point of engagement with said second shoe.

3. A brake comprising in combination a brake drum, an arcuate shoe, a pivot at one end of said shoe, a second shoe, a pivot supporting said second shoe at its end remote from the pivot of said first shoe, a lever pivoted adjacent the pivot for one of said shoes within said drum and acting on said shoe as a lever of the second order, and on the other shoe as a lever of the first order and means to apply a turning moment to said lever.

4. A brake comprising in combination a brake drum, an arcuate shoe, a pivot at one end of said shoe, a second shoe, a pivot supporting said second shoe, an arcuate lever extending at least partially round the drum and bearing against one shoe intermediate the ends of said shoe, a floating pivot at one end of said lever adjacent the pivoted end of said shoe and means to apply braking pressure to the end of said lever remote from said floating pivot.

5. A brake comprising in combination a brake drum, an arcuate shoe, a pivot at one end of said shoe, a second shoe, a pivot supporting said second shoe, an arcuate lever extending at least partially round the drum and bearing against one shoe intermediate the ends of said shoe, a floating pivot at one end of said lever and means to transfer pressure from said floating pivot to said second shoe, intermediate its ends.

6. A brake including a brake drum, a plurality of shoes, a pivotal support for each shoe, the pivotal support of each shoe being arranged at that end of the shoe remote from the pivotal support of an adjacent shoe, a plurality of levers, means for pivotally connecting said levers at their adjacent ends, means for mounting one end of the lever system about a fixed pivot, means for applying braking pressure to the remote end of the lever system, and means for transferring braking pressure by said levers to said shoes.

7. A brake comprising in combination a brake drum, an arcuate shoe, a pivot supporting said shoe at one end, a second shoe, a pivot supporting said second shoe at its end remote from the pivot of the first shoe, a lever pivoted at one end to that end of the second shoe remote from its supporting pivot, said lever engaging intermediate of its ends against said first shoe and means to apply braking pressure to said lever at its end remote from its pivotal connection to said second shoe.

8. A brake comprising in combination a brake drum, an arcuate shoe, a pivot supporting said shoe at one end, a second shoe, a pivot supporting said second shoe at its end remote from the pivot of the first shoe, the pivot of said second shoe being capable of a limited degree of peripheral displacement, a stop adjacent the other end of said second shoe adapted for engagement by said shoe, a lever pivoted at one end to that end of the second shoe remote from its supporting pivot said lever engaging intermediate of its ends against said first shoe and means to apply braking pressure to said lever at its end remote from its pivotal connection to the second shoe.

9. A brake comprising in combination a brake drum, an arcuate shoe, a pivot supporting said shoe at one end, a second shoe, a pivot supporting said second shoe at its end remote from the pivot of the first shoe, the pivot of said second shoe being capable of a limited degree of peripheral displacement, an abutment adjacent the other end of said second shoe adapted for engagement by said shoe, a lever engaging said first shoe intermediate the ends of the shoe and abutting against that end of said second shoe remote from the pivot of the second shoe and means to apply braking pressure to the end of said lever remote from its point of engagement with said second shoe.

ROBERT ALFRED CROCKETT.